United States Patent [19]
Beren et al.

[11] Patent Number: 5,434,507
[45] Date of Patent: Jul. 18, 1995

[54] METHOD AND APPARATUS FOR ELECTROMAGNETIC LOGGING WITH TWO DIMENSIONAL ANTENNA ARRAY

[75] Inventors: Jeffrey A. Beren, Westport; Tarek M. Habashy, Danbury; Yupai P. Hsu, Bethel; David R. Mariani, Darien, all of Conn.; Kambiz A. Safinya, Jakarta Selatan, Indonesia; M. Reza Taherian, Ridgefield, Conn.

[73] Assignee: Schlumberger Technology Corporation, New York, N.Y.

[21] Appl. No.: 890,049

[22] Filed: May 27, 1992

[51] Int. Cl.[6] .............................. G01V 3/30
[52] U.S. Cl. ............................ 324/338; 324/341
[58] Field of Search .................. 324/337–341, 324/366–371; 364/422; 343/746, 767, 770, 771

[56] References Cited

U.S. PATENT DOCUMENTS

| | | | |
|---|---|---|---|
| 3,849,721 | 11/1974 | Calvert . | |
| 3,994,910 | 3/1976 | Rau . | |
| 4,340,934 | 7/1982 | Segesman | 364/422 |
| 4,360,777 | 11/1982 | Segesman | 324/339 |
| 4,468,623 | 8/1984 | Gianzero et al. | 324/367 |
| 4,567,759 | 2/1986 | Ekstrom et al. | 73/152 |
| 4,652,829 | 3/1987 | Safinya | 324/338 |
| 4,689,572 | 8/1987 | Clark | 324/341 |
| 4,692,908 | 9/1987 | Ekstrom et al. | 367/27 |
| 4,704,581 | 11/1987 | Clark | 324/341 |
| 4,766,384 | 8/1988 | Kleinberg et al. | 324/339 |
| 4,831,331 | 5/1989 | De et al. | 324/338 |
| 4,857,852 | 8/1989 | Kleinberg et al. | 324/339 |
| 4,893,084 | 1/1990 | Ray | 324/338 X |
| 4,979,151 | 12/1990 | Ekstrom et al. | 367/35 |
| 5,066,916 | 11/1991 | Rau | 324/338 |
| 5,144,245 | 9/1992 | Wisler | 324/338 |
| 5,210,495 | 5/1993 | Hapashy et al. | 324/338 |
| 5,345,179 | 9/1994 | Habashy et al. | 324/338 |

Primary Examiner—Sandra L. O'Shea
Assistant Examiner—Warren S. Edmonds
Attorney, Agent, or Firm—Martin M. Novack; Leonard W. Pojunas

[57] ABSTRACT

A two-dimensional array of slot antennas which can provide two-dimensional quantitative dielectric and conductivity images of formations in the region surrounding an earth borehole. The antennas are mounted in a wall-engaging member of a logging device that is moveable through the borehole. Selected ones of the antennas are energized at given times to transmit electromagnetic energy into the formations, the electromagnetic energy being received at other antennas for processing to obtain formation properties.

38 Claims, 18 Drawing Sheets

|T|T|
|---|---|
|R|R|
|R|R|
|T|T|

FIG.15A

|R|R|
|---|---|
|T|T|
|T|T|
|R|R|

FIG.15B

|T|R|R|T|
|---|---|---|---|
|T|R|R|T|

METHOD AND APPARATUS FOR ELECTROMAGNETIC LOGGING WITH TWO DIMENSIONAL ANTENNA ARRAY

RELATED APPLICATIONS

The subject matter of this application is related to subject matter disclosed in U.S. patent application Ser. No. 848,621, now U.S. Pat. No. 5,345,179, of T. Habashy, R. Taherian, A. Dumont, and J. Beren, and U.S. patent application Ser. No. 848,576, now U.S. Pat. No. 5,210,495, of T. Habashy, J. Beren, and K. Safinya, both filed on Mar. 9, 1992, and both assigned to the same assignee as the present application. The subject matter of this application is also related to subject matter disclosed in U.S. patent application Ser. No. 706,454, filed May 24, 1991, of K. Safinya, T. Habashy, and J. Beren, assigned to the same assignee as the present application, now abandoned.

FIELD OF THE INVENTION

This invention relates to logging of earth boreholes and, more particularly, to a method and apparatus for logging using electromagnetic energy.

BACKGROUND OF THE INVENTION

The measurement of dielectric constant (or dielectric permittivity) of formations surrounding a borehole is known to provide useful information about the formations. The dielectric constant of the different materials of earth formations vary widely ( for example, 2.2 for oil, 7.5 for limestone, and 80 for water), so measurement of dielectric properties is a useful means of formation evaluation.

A logging device which measures formation dielectric constant is disclosed in the U.S. Pat. No. 3,944,910. The logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations can then be obtained from the phase and attenuation measurements. Measurements are typically, although not necessarily, made on the formation invaded zone. Two transmitters are generally used in a borehole compensated array to minimize the effect of borehole rugosity, tool tilt, and dissimilarities in the transmitters, receivers, and their circuits. [See, for example, U.S. Pat. No. 3,849,721. ]

The antennas shown in U.S. Pat. No. 3,944,910 are slot antennas, each having a probe that extends across the slot in a direction parallel to the longitudinal direction of the borehole. This configuration has become known as a "broadside" array. The U.S. Pat. No. 4,704,581 describes a logging device of similar type, but wherein the slot antennas have probes that extend in a direction perpendicular to the longitudinal direction of the borehole. This configuration has become known as an "endfire" array. The endfire array exhibits a deeper depth of investigation and is less affected by tool standoff (e.g. from mudcake or poor pad contact) than the broadside array. On the other hand, the broadside array exhibits a stronger signal characteristic than the endfire array and may be preferred in relatively lossy (low resistivity) logging environments.

A logging device which utilizes teachings of the above-referenced U.S. Pat. Nos. 3,944,910 and 4,704,581 is the electromagnetic propagation tool ("EPT"—mark of Schlumberger). A so-called adaptable EPT ("ADEPT") can provide either broadside operation or endfire operation during a given logging run, depending on conditions. The ADEPT logging tool has two changeable pads, one containing a broadside antenna array and the other an endfire antenna array.

Existing electromagnetic propagation logging techniques provide measurements of dielectric permittivity and conductivity as a function of the single dimension z, where z is distance measured along the longitudinal axis of the borehole. It is well known that the electrical properties of the formations intersected by a borehole are not azimuthally invariant. Dipping or fractured beds and other heterogeneities such as rugs or localized washouts generally cannot be characterized by one-dimensional measurements.

It is among the objects of present invention to provide improvements in electromagnetic propagation logging techniques that will permit obtainment of azimuthal measurements of dielectric constant and conductivity.

It is also among the general objects of the present invention to provide improved techniques and equipment for the accurate determination of properties of subsurface formations using electromagnetic energy having a magnetic dipole characteristic.

SUMMARY OF THE INVENTION

Applicants have devised a two-dimensional array of slot antennas which can provide two-dimensional quantitative dielectric and conductivity images of formations in the region surrounding the borehole. By obtaining measurements over a two-dimensional array, and then using known log interpretation techniques, one can obtain, for example, two-dimensional maps of water-filled porosity.

Two-dimensional arrays of electrodes have been previously used to obtain two-dimensional conductivity images of the cylindrical borehole wall by injecting low frequency current into the formations. [Reference can be made, for example to U.S. Pat. Nos. 4,468,623, 4,567,759, and 4,692,908.] Images from these arrays cannot readily be converted into quantitative images of water saturation. Also, current injection schemes are of limited use if the drilling mud is highly resistive, since the drilling mud forms an insulating layer between the electrodes and the formation intended to be measured. The measurements of the present invention are taken with electromagnetic energy from an array of slot antennas, and overcome the indicated disadvantages.

In copending U.S. patent application Ser. No. 706,454, of K. Safinya, T. Habashy, and J. Beren, filed May 24, 1991, now abandoned, and assigned to the same assignee as the present application, there is disclosed a so-called "cross-dipole" antenna that can be energized to produce electromagnetic energy having a magnetic dipole characteristic with a selectable magnetic moment direction. These antennas can be used, for example, to obtain an endfire operating mode at a particular time and a broadside operating mode at another time. The antennas have orthogonal probes in a slot, and the angle (or direction) of the magnetic moment can be adjusted by applying signals of appropriate amplitude and phase to the probes. It is demonstrated in the copending Application that when the magnetic moment or the longitudinal direction of the array is perpendicular to the formation bedding direction, the logging image is sharper; i.e., bed boundaries and measurement values are more accurately delineated. The copending Application also observes that improved standoff performance (that is, immunity to the media between the logging device antennas and the formations) is obtained when the magnetic moment is parallel to the borehole axis. However, the bedding direction and/or the precise orientation of the tool with respect to the borehole may not be known a priori.

The present invention provides improved flexibility in the obtainment of electromagnetic propagation logging information, and enables the obtainment by a logging device of measurement information on larger regions of the formations than existing electromagnetic propagation types of logging devices.

In accordance with an embodiment of the invention, there is provided an apparatus for determining properties of earth formations surrounding a borehole. A device is moveable through the borehole and has a member mounted thereon which is adapted for engagement with the borehole wall. A two-dimensional array of slot antennas is mounted in the member. Means are provided for energizing at least a selected one of said antennas to transmit electromagnetic energy into the formations. Means are also provided for receiving said electromagnetic energy at at least a selected one of said antennas.

In a preferred embodiment of the invention, said means for energizing at least one of said antennas can be controlled to energize, at different times, several different antennas, and said means for receiving said electromagnetic energy can be controlled to receive energy from different selected receivers at different times.

In a preferred embodiment, the slot antennas of the array have respective probes which extend across the slot, and each of said probes is coupled with said energizing means and/or said receiving means. In a form of this embodiment, at least some of the slot antennas have a further probe extending across the slot in a direction orthogonal to the direction of the first-mentioned probe, the further probes being coupled with said energizing means and/or said receiving means.

The two-dimensional array preferably comprises an array of at least 4 by 2 slot antennas and, more preferably, at least 4 by 4 slot antennas. In illustrated embodiments hereof, larger arrays are employed. Selected antennas of these arrays can provide a variety of one-dimensional operating arrays of transmitters and receivers which operate at different times or at different frequencies. These operating arrays have their antenna centers in a substantially straight line, and can be at a variety of angles with respect to the axes of the array. The one dimensional arrays may be, for example, of the form TRRT, RTTR, TTRRTT or RRTTRR.

The received signals can be utilized to determine the amplitude and/or phase of electromagnetic energy received at the receivers, and this information can be utilized to determine the dielectric permittivity and/or conductivity of formations through which the electromagnetic energy has propagated. The measurements are effective in conductive muds, resistive muds, and open hole.

In addition to the ability to provide several different linear array operational angles with respect to the tool axis, the two-dimensional array also enables obtainment of logging information at different azimuthal angles, for example by activating a number of different vertical columns (or strips) of the array in sequence, or simultaneously at different frequencies.

In accordance with a further feature of the invention, there is provided an antenna array and processing that can be used to determine changes in dielectric constant as well as conductivity as the logging device is moved longitudinally through the borehole. This provides useful bed boundary information. Again, by providing a plurality of such antenna arrangements at different azimuthal positions with respect to the borehole axis, bed boundary information can be obtained at different azimuthal positions, and the two-dimensional information can be used for various purposes including determination of the dip and azimuth of formation bedding planes.

Further features and advantages of the invention will become more readily apparent from the following detailed description when taken in conjunction with the accompanying drawings.

BRIEF DESCRIPTION OF THE DRAWINGS

FIGS. 7, 8, 9, 10, 11, 12, 13, 14, 15A-B, 16, 17A-F, and 18A-E illustrate examples of arrays and of antenna configurations in accordance with embodiments of the invention.

DETAILED DESCRIPTION

Figure 1:
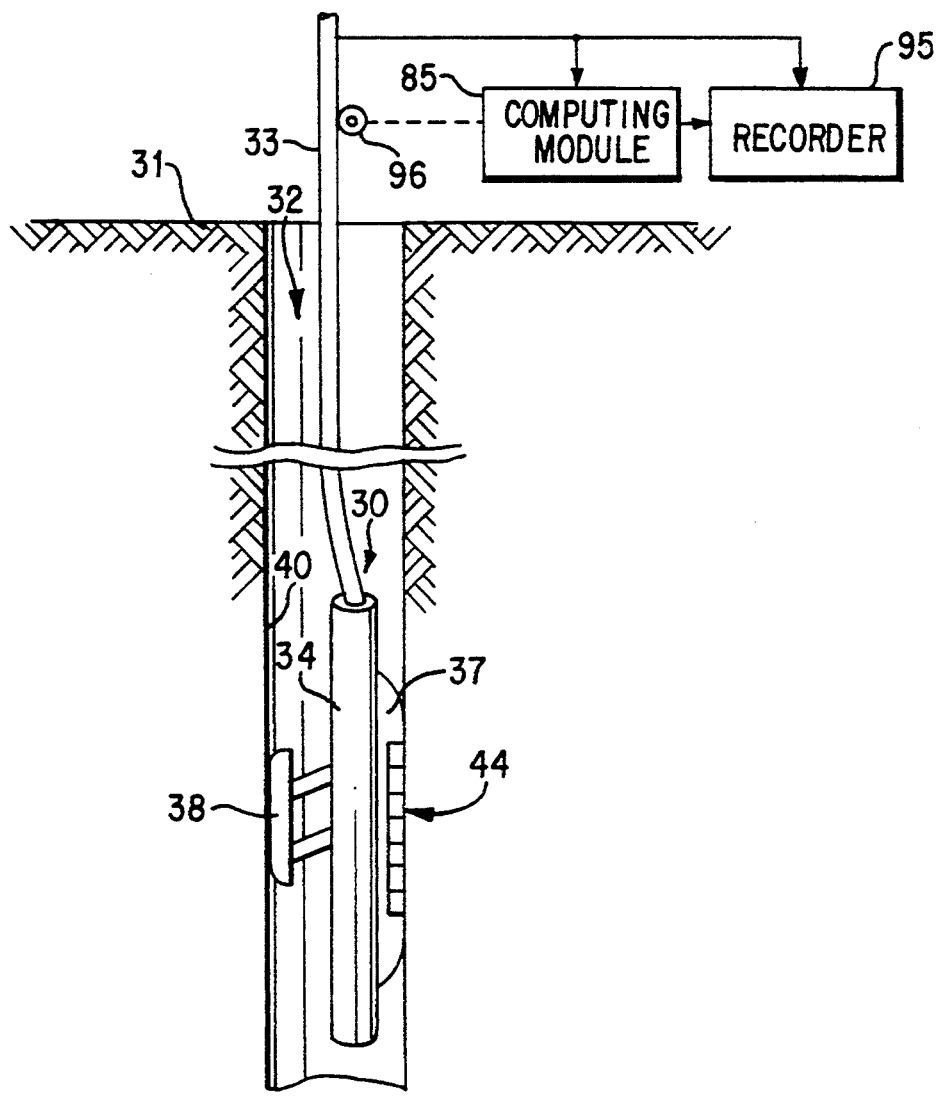
FIG. 1 is a schematic representation, partially in block diagram form, of apparatus which can be used in practicing embodiments of the invention.

Referring to FIG. 1, there is shown an apparatus 30, for investigating subsurface formations 31 traversed by a borehole 32, which can be used in practicing embodiments of the invention. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 can form on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a housing containing the bulk of the downhole electronics. Mounted on one side of sonde 34 is a pad 37 which contains an array 44 of slot antennas. On the other side of sonde 34 is mounted a backup arm 38 which may be hydraulically controlled to maintain the pad 37 in contact with the borehole wall. The backup arm 38 can also be used to provide a caliper reading. [The pad 37 mounted directly on the sonde 34 is sometimes also referred to as a skid. The term "pad" is used herein and is intended to generically indicate an intention of contact with the surface of the borehole wall.] The particular means shown in FIG. 1 for maintaining the antennas in engagement with the borehole wall is illustrative, and it will be appreciated that other known suitable means for accomplishing this objective can be utilized. In embodiments hereof, signals are stored downhole by memory associated with a downhole processor, but it will be understood that some or all signals could be transmitted uphole for processing and/or storage. Electronic signals indicative of the information obtained by the logging device can be transmitted through the cable 33 to a computing module 85 and a recorder 95, located at the surface of the earth. Depth information to the recorder 95 and computing module 85 can be provided from a rotating wheel 96 that is coupled to the cable 33. The computing module 85 will typically include a processor, and associated memory, timing, input/output, display, and printing functions, none of which are separately shown.

Figure 2:
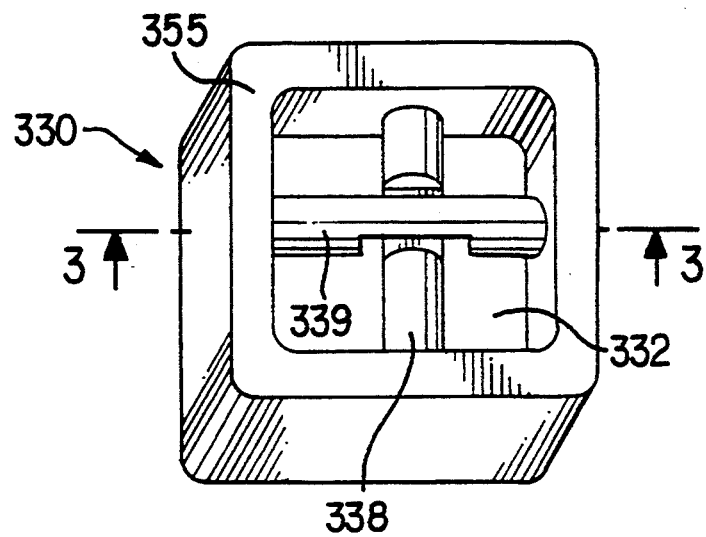
FIG. 2 is an elevational perspective view of a cross-dipole antenna that can be used in embodiments of the invention.
Figure 3:
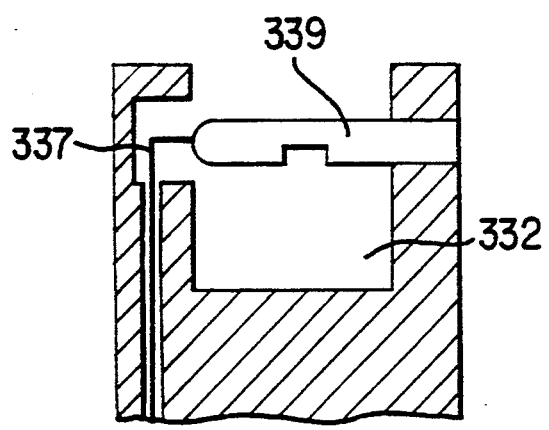
FIG. 3 is a cross-sectional view as taken through a section defined by arrows 3—3 of FIG. 2.

As first noted above, in the copending U.S. patent application Ser. No. 706,454 there is disclosed a cross-dipole antenna that can be energized to produce electromagnetic energy having a magnetic dipole characteristic. FIGS. 2 and 3 show the cross dipole antenna, which is used in the embodiments hereof. The antenna 330 comprises a generally square aperture or slot 332 in a metal body 355. Metal probe elements 338 and 339 cross the slot from different opposing sides, but are notched at their centers, so as to not touch where they cross. A dielectric material fills the rest of the slot. The cross-section of FIG. 3 shows one of the probes (339), which is seen to be shorted at one end to a wall of the slot 332. The other end of the probe is coupled to a conductor wire 337 which is insulated for passage through the body, and is coupled with transmitter and/or receiver circuitry, depending on the intended purpose of the antenna. The other probe is similarly constructed.

Figure 4C:
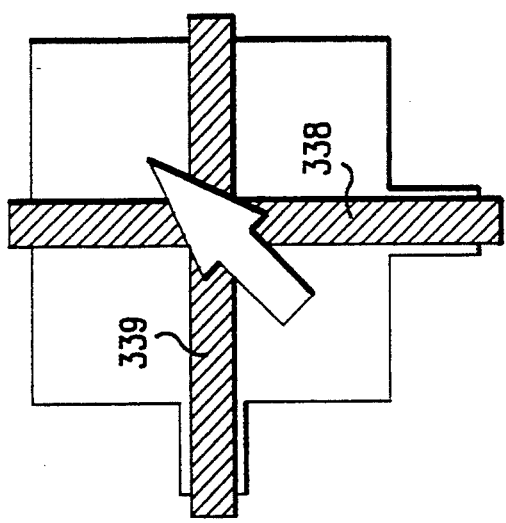
FIGS. 4A, 4B and 4C illustrate magnetic dipole moments that can be obtained with the antenna of FIG. 3.
Figure 4B:
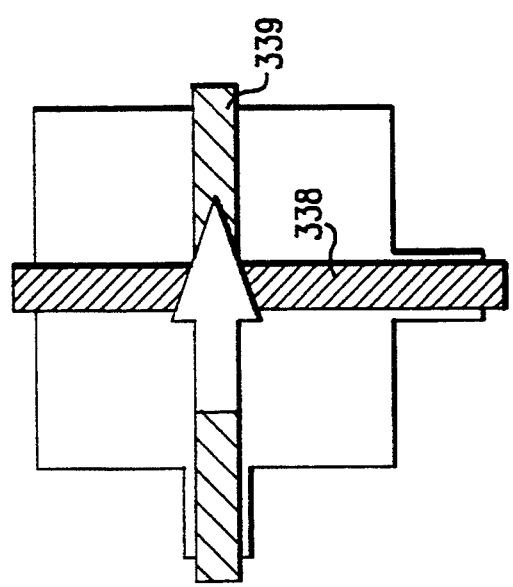
Figure 4A:
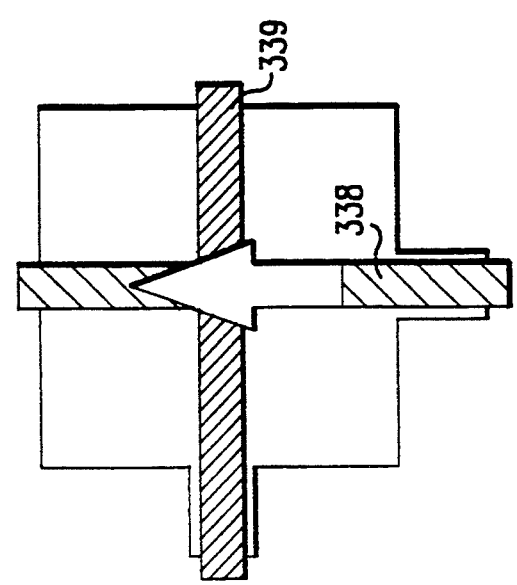

As described in the referenced copending U.S. patent application Ser. No. 706,454, the cross-dipole antenna probes can be used to produce electromagnetic energy with a controlled magnetic moment direction (or angle). Referring, for example, to FIG. 4A, assume that the vertical probe element 339 is parallel to the longitudinal axis of the logging device and that the horizontal element 338 is perpendicular to said axis. Excitation of only the horizontal probe element (shown darkened) results in a vertical magnetic moment (as indicated by the arrow) and operation in an endfire mode. In the illustration of FIG. 4B, only the vertical probe element is excited, resulting in a horizontal magnetic moment and operation in a broadside mode. In FIG. 4C both probe elements are excited by application of equal signals to the probe elements, resulting in a 45 degree magnetic moment, as shown. As further described in the referenced copending application Ser. No. 706,454, application of signals of appropriate relative amplitudes and phases to the respective probe elements can produce a magnetic moment in any desired direction. Also, the antennas can be excited to operate in endfire and broadside modes either sequentially or simultaneously (an example of the latter being simultaneous transmission or reception at slightly different frequencies, such as 1.03 GHz and 1.00 GHz, which are substantially equivalent from a rock physics standpoint but which reduce cross-coupling between the probes).

Figure 5:
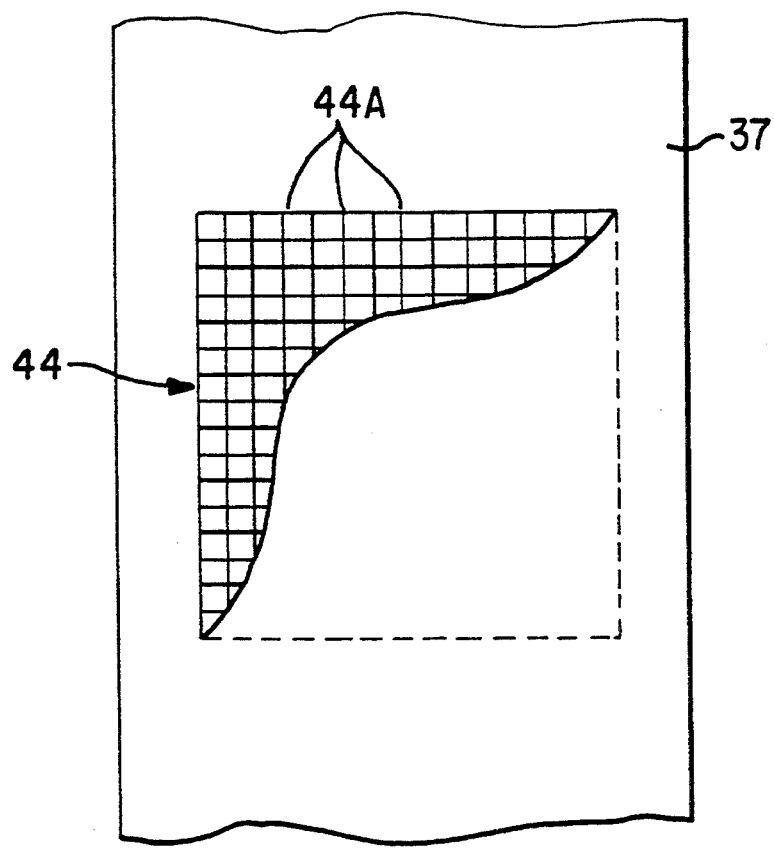
FIG. 5 is a partially broken away diagram of an antenna array in accordance with an embodiment of the invention.

FIG. 5 illustrates an example of the two-dimensional array 44 of cross-dipole antennas. The antennas of the FIG. 5 embodiment are mounted in the pad 37 as a number of one-dimensional strips 44A of cross-dipole slot antennas, the strips being mounted side-by-side in the body of the pad. The probe wiring for each strip can run in a harness adjacent to a frame of the strip. Alternatively, the individual cross-dipole antennas can be inserted as modules into a two-dimensional frame of square apertures, with the wiring to the probes being formed into a bundle that is coupled to circuitry in the sonde 34.

In the embodiments hereof, each cross-dipole antenna element is addressable to be used as a transmitting antenna or a receiving antenna at a particular time under control of a processor. It will be understood, however, that for various applications it may be adequate to have some or all antenna elements be used as only transmitters or only as receivers. Also, some or all of the antenna elements can have a single probe, such as for broadside or endfire operation.

Figure 6:
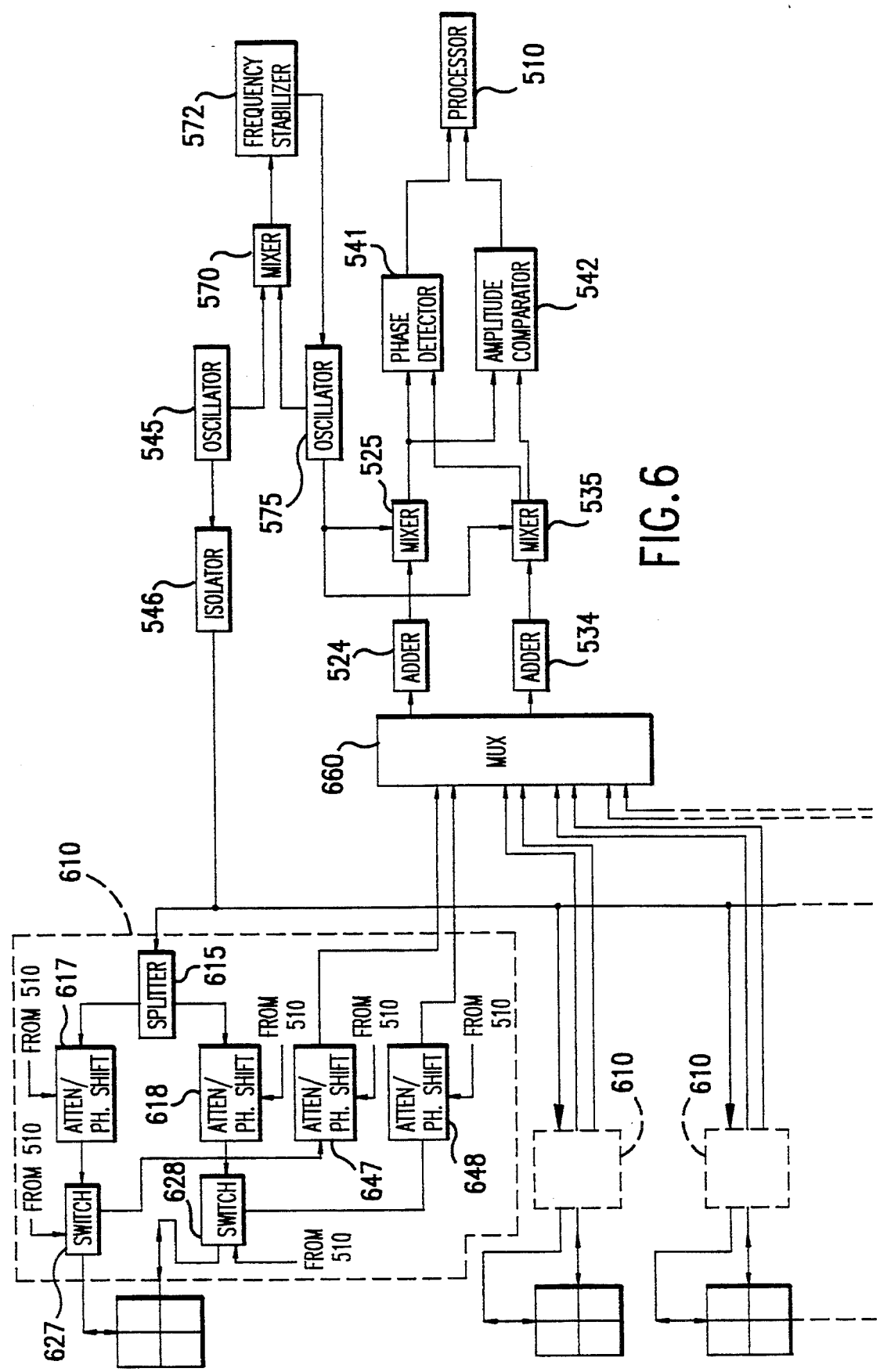
FIG. 6 is a schematic diagram, partially in block form, of the downhole circuitry in accordance with an embodiment of the invention.

FIG. 6 shows the electronics, at least part of which may be contained within the sonde 34. An oscillator 545 provides output energy which, in the present invention, is preferably greater than 100 MHz, and, in the example hereof is 1100 MHz. The output of oscillator 545 is coupled to an isolator 546. The isolator 546 is coupled, in this embodiment, to each cross-dipole slot antenna unit of the FIG. 5 array, FIG. 6 showing the circuitry 610 associated with one of the cross-dipole slot antenna units. Each circuit 610 includes a splitter 615 that receives signal from the isolator 546 and couples the split output to respective attenuator/phase-shifters 617 and 618. The outputs of the attenuator/phase-shifters 617 and 618 are respectively coupled to switches 627 and 628. The attenuator/phase-shifters 617, 618 and the switches 627,628 are under control of a processor 510. The attenuator/phase-shifters are adjustable, under control of the processor, to adjust the attenuation and/or the phase of the signals applied thereto so as to control the direction (or angle) of the magnetic moment. Reference can be made, for example, to the above-referenced co-pending U.S. patent application Ser. No. 706,454, filed May 24, 1991, and to U.S. patent application Ser. Nos. 848,621 and 848,576, both filed Mar. 9, 1992. Respective terminals of the switches 627 and 628 are coupled with respective ones of the probes of the slot antenna unit; that is, to the probes which can excite and/or receive the previously described endfire and broadside modes of operation. Further respective terminals of the switches 627 and 628 are coupled to respective attenuator/phase-shifters 647 and 648, the outputs of which are coupled to a multiplexer 660. The attenuator/phase-shifters 647, 648, and the multiplexer 660 are under control of the processor 510. The multiplexer selects two of its inputs to pass to adders 524 and 534, which include buffers, and can also be under processor control. The outputs of the adders 524 and 534 are respectively coupled to mixers 525 and 535. The outputs of mixers 525 and 535 are inputs to a phase detector 541 and are also inputs to an amplitude comparator 542. The outputs of phase detector 541 and amplitude comparator 542 are coupled to the downhole processor 510, which may be, for example, a digital processor having associated memory, timing, and input-/output capabilities (not separately shown). A second input to mixers 525 and 535 is the output of a voltage-controlled oscillator 575 which is under control of a frequency stabilizer circuit 572. The outputs of oscillators 545 and 575 are coupled to mixer 570, the output of which is coupled to frequency stabilizer 572.

In the illustrated embodiment, at least two transmitters can be alternately enabled to implement "borehole compensated" operation. Electromagnetic energy is transmitted sequentially from transmitters into the surrounding media. As described in the above-referenced copending U.S. Patent Applications, the processor can readily sequence energizing of the four transmitter probes of two transmitting antennas. Energy received at the receiving antennas is coupled via the attenuator/phase-shifters and adders to inputs of the mixers 525 and 535. The signals which arrive from the receivers are out of phase with each other by a phase angle which depends upon properties of the media through which the energy has passed and have an amplitude ratio which also depends upon properties of such media. The secondary inputs of the mixers are supplied with energy at a frequency that is separated from the transmitter frequency by some relatively low frequency which is typically in the kilohertz frequency range. In the illustrated embodiment, oscillator 575 supplies electromagnetic energy to mixers 525 and 535 at a frequency that is, for example, 10 KHz. above the transmitter frequency. The outputs of the mixers 525 and 535 therefore contain the difference frequency of 10 KHz. In accordance with well known principles, the mixer outputs maintain the phase and amplitude relationships of the signals from the receivers, but the task of phase detection is greatly facilitated at the lower frequency of the mixed signals. To ensure that the difference frequency between the outputs of the oscillators 545 and 575 remains at 10 KHz, the oscillator outputs are sampled and fed to the mixer 570. The output of the mixer is received by the frequency stabilization circuit 572 which detects drifts from the 10 KHz standard and generates a correction signal which controls oscillator 575 in the manner of a conventional "phase-locked loop". As above-indicated, the mixer outputs are applied to the phase detector 541 and to the amplitude comparator 542. The output of the phase detector 541 is a signal level which is proportional to the phase difference between the signals received at the receivers and the output of amplitude comparator 542 is a signal level which is proportional to the relative amplitudes of the signals received at the receivers.

As described in the above-referenced copending U.S. Patent Applications, the amplitudes and phases of the signals applied to the transmitter probes and/or the signals received from the receiver probes can be adjusted under processor control to obtain any desired magnetic moment direction. The processor can control the attenuator/phase-shifters to obtain the desired amplitudes and phases. The switches 627 and 628 operate, under processor control, to either pass signal from the transmitter circuitry to a selected antenna probe, to couple a selected antenna probe to the receiver circuitry, or to decouple the selected probe when not being used. The multiplexer 660 selects the particular received signals that are coupled to the receiver circuitry adders at a particular time.

FIGS. 7–18 illustrate various antenna arrays and/or transmitter and receiver selections that can be utilized for various operating arrays of antennas, it being understood that other array sizes can be utilized. It will also be understood that while cross-dipole antennas are generally represented in the illustrated embodiments, antennas with single probes can also be employed. It will be further understood that the magnetic moment directions (or angles) can be selected as desired, for example to a broadside mode, an endfire mode, or a magnetic moment direction that corresponds to the direction of the line through the centers of the currently operational antenna units.

Figure 7:
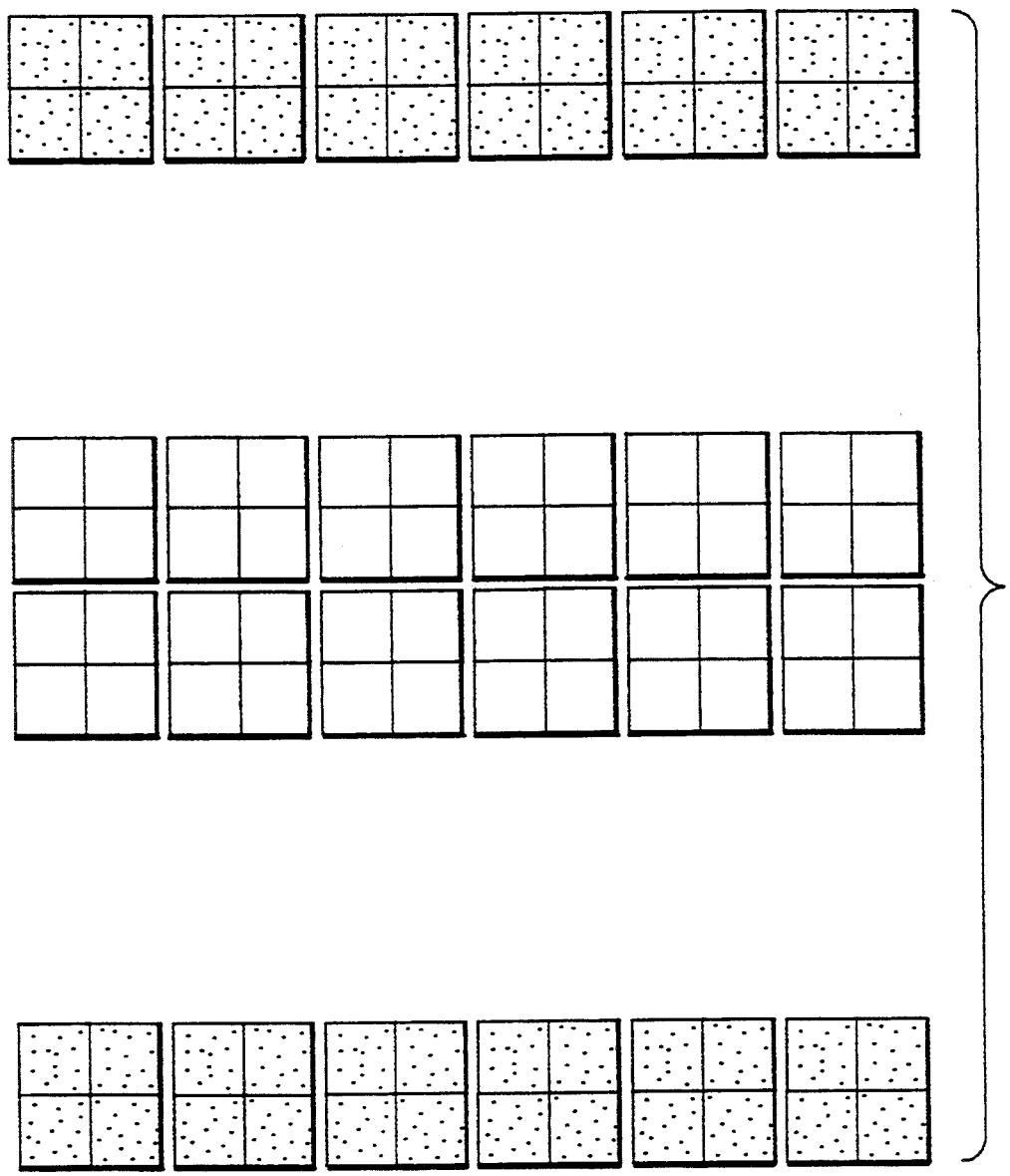

FIG. 7 illustrates an array of 24 antennas arranged as six adjacent T-RR-T (or R-TT-R) one-dimensional strips, with each strip having a substantial spacing between its center antenna pair and its end antennas. For a T-RR-T configuration, the transmitting antennas are shown shaded. In general, the vertical resolution is related to the spacing between receivers and the horizontal resolution is related to the spacing between the individual antenna strips.

Figure 8:
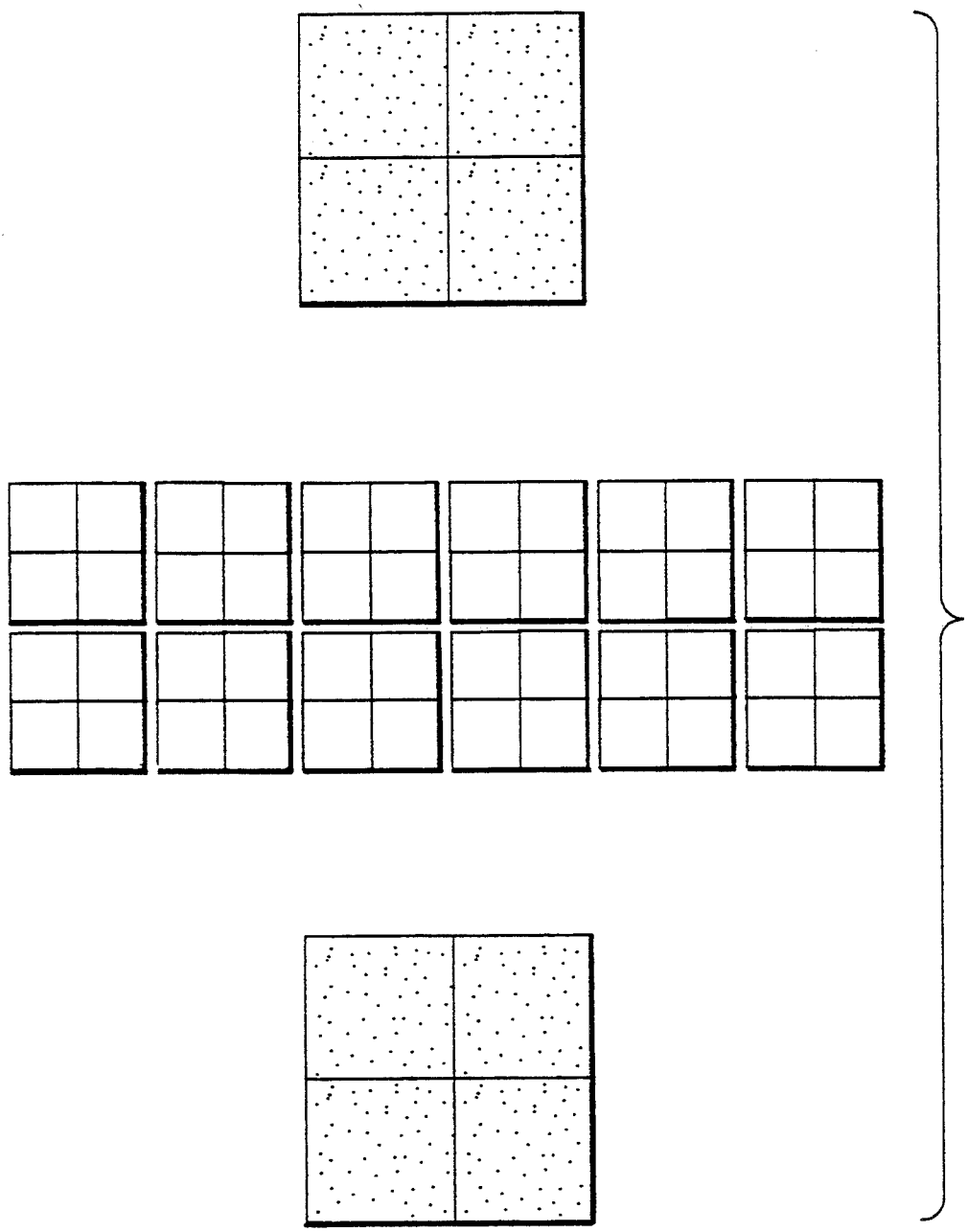

In the embodiment of FIG. 8, the six receiver pairs are the same as in FIG. 7, but there is a single large transmitting antenna at each end (the transmitting antennas again being shown shaded). The larger antennas can more easily transmit at higher power levels, and thereby provide improved imaging, particularly in very lossy formations.

Figure 9:
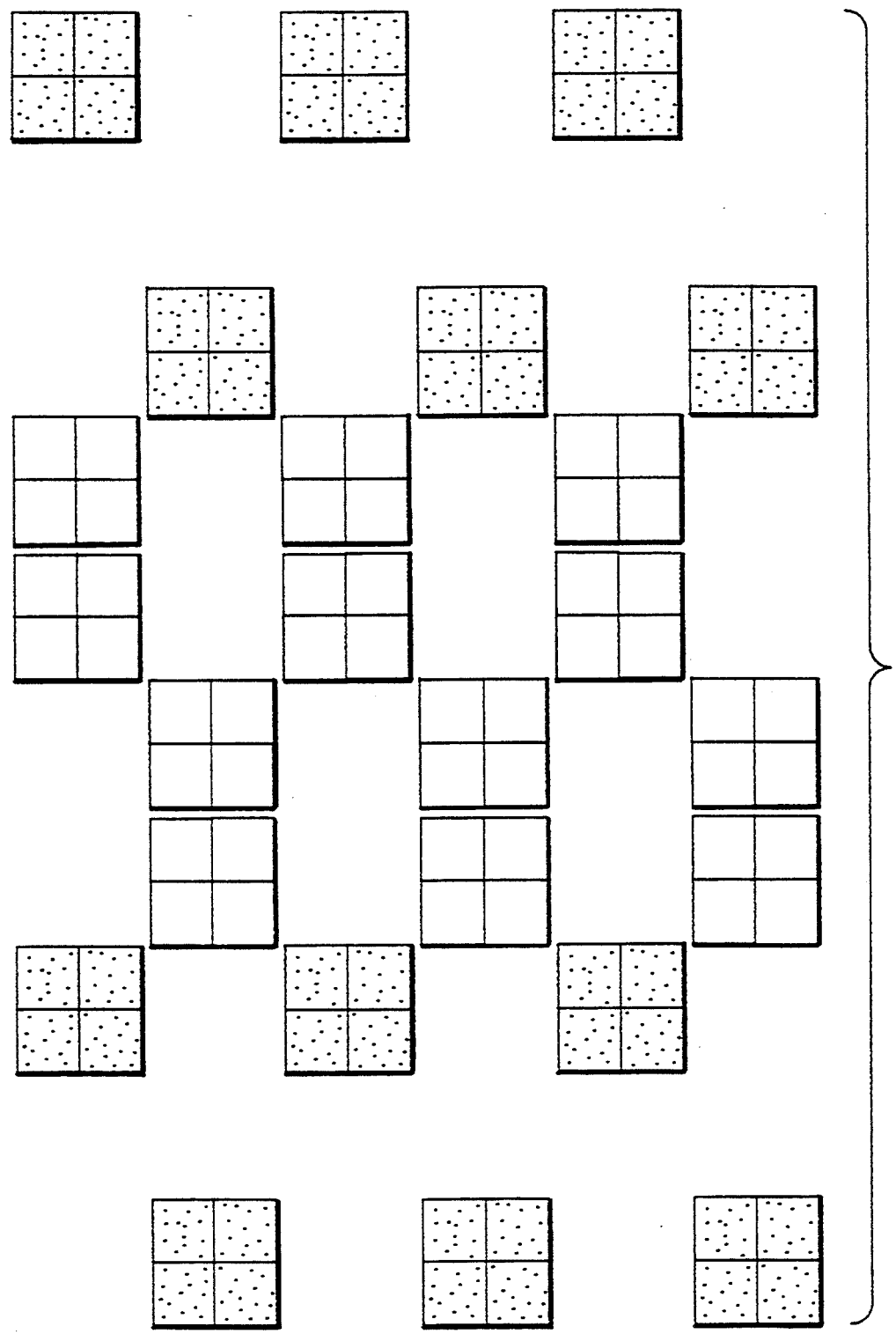
Figure 10:
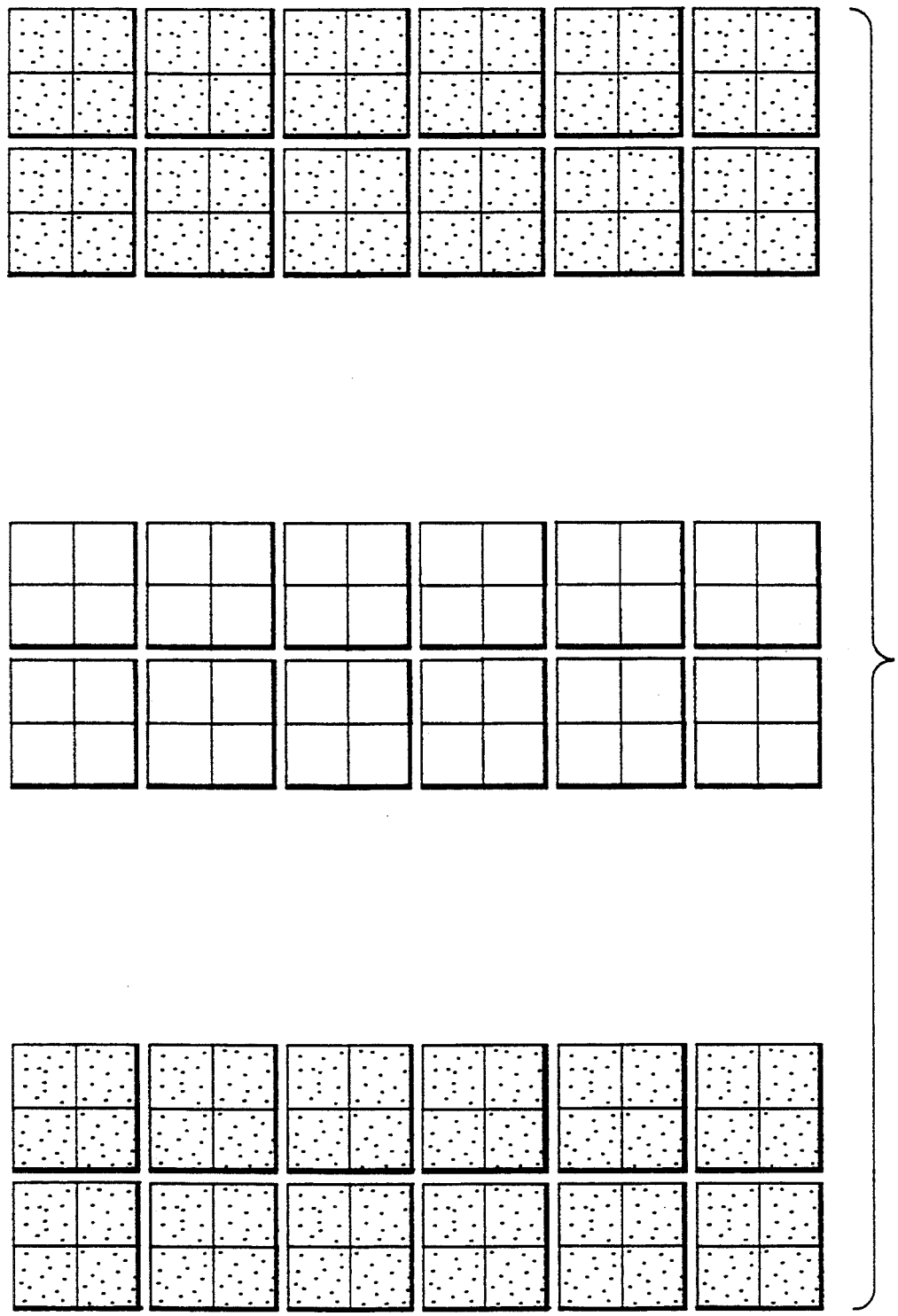

In the embodiment of FIG. 9, adjacent strips are staggered so that no two antennas are adjacent to each other in the azimuthal direction. This configuration reduces the cross-talk between antennas in adjacent strips. Stated another way, the configuration of FIG. 9, reduces signal scattering between antennas.

In the above referenced U.S. patent application Ser. No. 848,621 there is disclosed a TT-RR-TT (or RR-TT-RR) arrangement of antennas which, inter alia, can provide measurement information and/or correction for standoff effects; i.e., the effect of the spacing between the face of the logging tool and the borehole wall surface (resulting generally from the difficulty of maintaining good wall contact over the entire length of the tool pad). [Inversion techniques as disclosed in said application Ser. No. 848,621 can also be used in conjunction with the present invention.] The embodiment of FIG. 10 has an antenna arrangement with six antennas in a strip for obtainment of measurements as in said referenced Application, but with the additional capability of obtaining azimuthal data from the plural columns of strips.

Figures 11, 12:
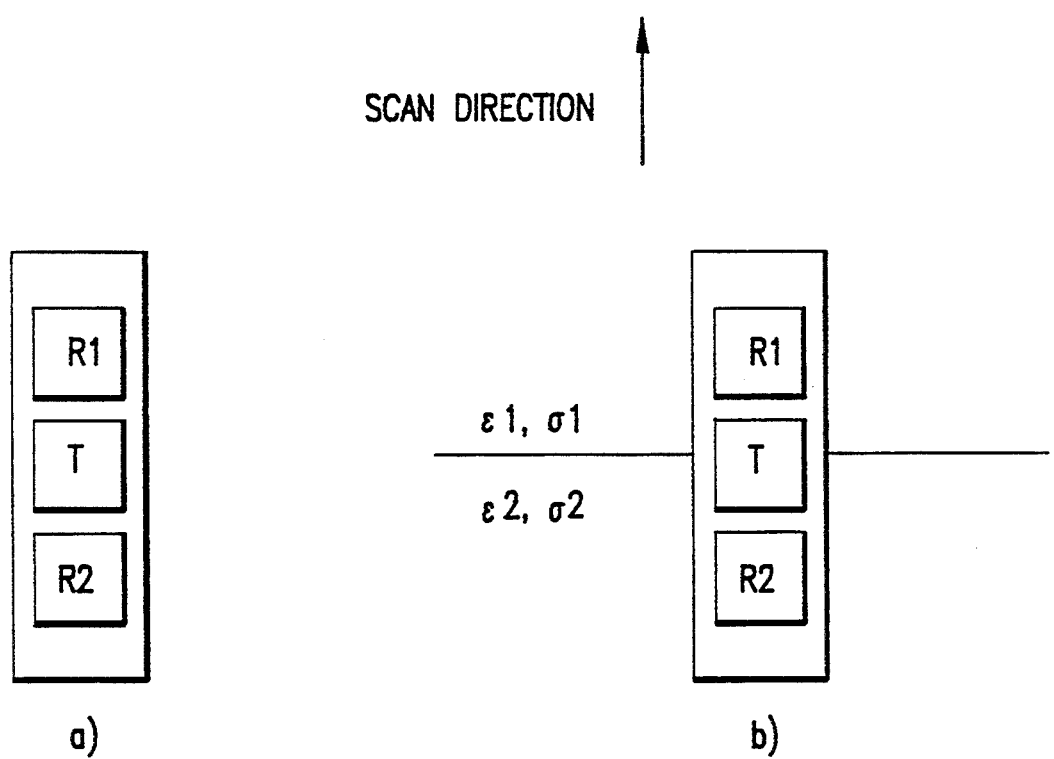

In accordance with a feature of the invention, there is provided an arrangement of slot antennas that can be utilized to identify bed boundaries. An advantage of this feature is that contrasts in dielectric permittivity, as well as conductivity, can be detected with relatively high resolution. [Devices which determine conductivity changes at relatively high resolution are disclosed, for example, in U.S. Pat. Nos. 4,766,384 and 4,857,852. Reference can also be made to U.S. Pat. No. 4,831,331.] This can be advantageous for operation in thinly laminated zones and in identifying boundaries between fresh water and hydrocarbon zones. A three antenna vertical strip in accordance with an embodiment of this feature of the invention is shown in FIG. 11. A central transmitting antenna T is symmetrically flanked by two receiving antennas, R1 and R2. The array may be, for example, in the pad 37 of FIG. 1, with the transmitter and receivers coupled with circuitry of the type shown in FIG. 6. Electromagnetic energy transmitted by the transmitter T propagates through the surrounding media and is received by the two receiving antennas. If, in a homogeneous medium, the radiation pattern of the transmitter is symmetric with respect to the positions of identical receivers, the ratio of the receivers' complex signals will be substantially 0; that is, the relative attenuation will be 0 dB and the relative phase will be 0 degrees. This substantially zero response will occur in a "thick bed", relatively far from its boundaries with adjacent beds. However, as illustrated in FIG. 12, when the array is in the vicinity of a boundary between two beds of differing electrical properties, the signal ratio is no longer unity. Qualitatively, when the transmitter is exactly at the boundary, the signal detected in receiver R1 is predominantly determined by the electrical properties of medium 1 while the signal in receiver R2 is predominantly determined by the electrical properties of medium 2. Hence, if wave scattering from bed boundaries is not too severe, a fairly sharp response only near bed boundaries can be expected. A logging device in this arrangement is a "relative" device since it responds to the relative changes in electrical properties of the formation. The receivers are preferably close to the transmitter so that the signal strength in each receiver is always high and vertical resolution is maximized. Operation at frequencies $\omega$ such that $\sigma/\omega\epsilon \sim 1$ (where $\sigma$ is the electrical conductivity of the formation and $\epsilon$ is its dielectric constant) makes the device sensitive to both permittivity and conductivity changes. Operating at higher frequencies (for example $\sigma/\omega\epsilon < 0.1$) increases sensitivity to dielectric permittivity. An operating frequency of at least about 100 MHz is generally preferred for determination of permittivity.

Figure 13:
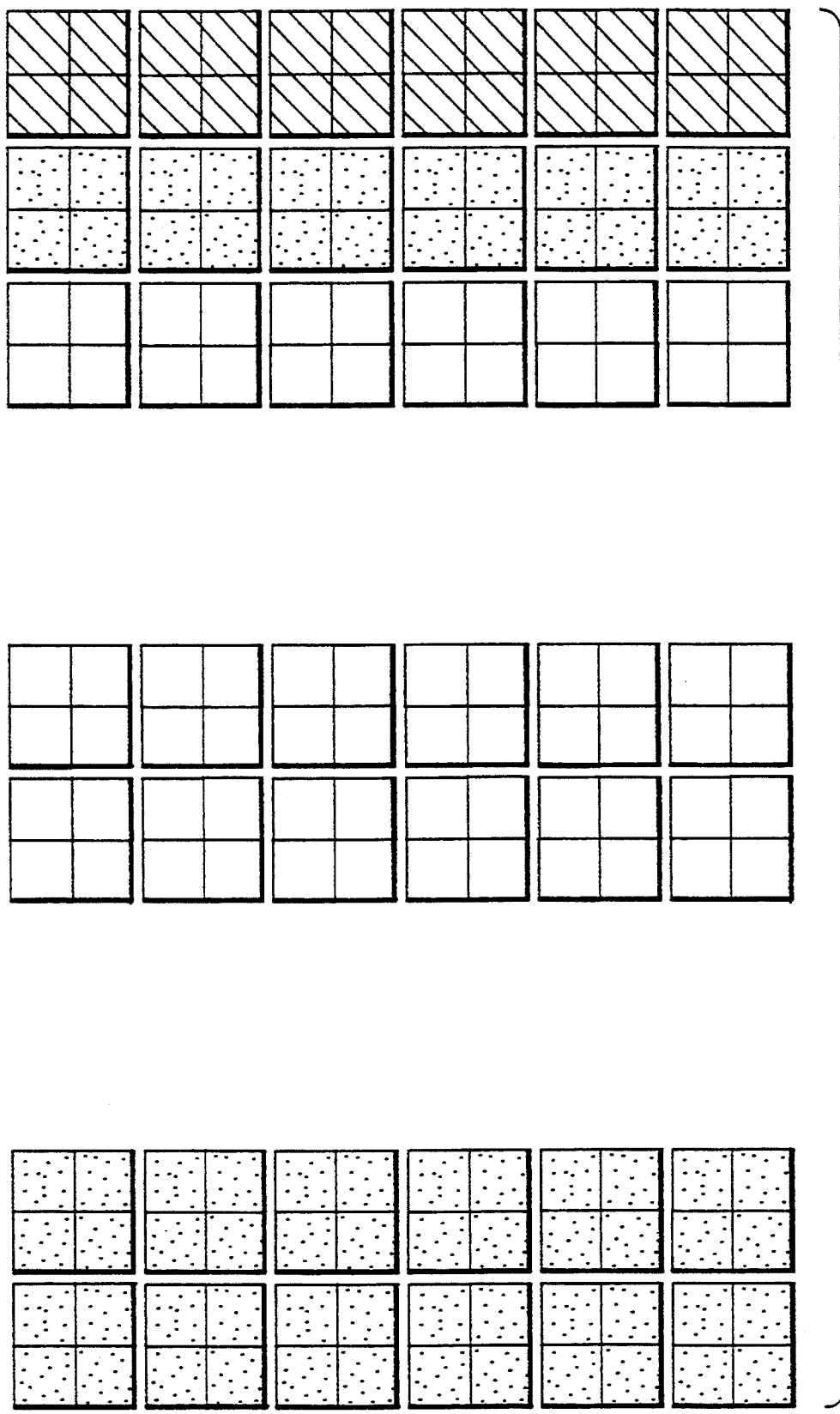

In the embodiment of FIG. 13 the bed boundary detection approach of FIGS. 11, 12 is incorporated in an array that can also provide azimuthal information, such as is indicated by the top three rows of FIG. 13. In other respects, the array is like that of FIG. 10. The antennas which are cross-hatched operate as either transmitters or receivers depending on which selections are made during the data acquisition. For example, the antennas in the top row are driven as transmitters when acquiring data for imaging purposes, but are used as receivers when acquiring data for the described bed boundary detection. Any suitable groups of antennas in the arrays hereof can also be used for bed boundary detection in the indicted manner.

Figure 14:
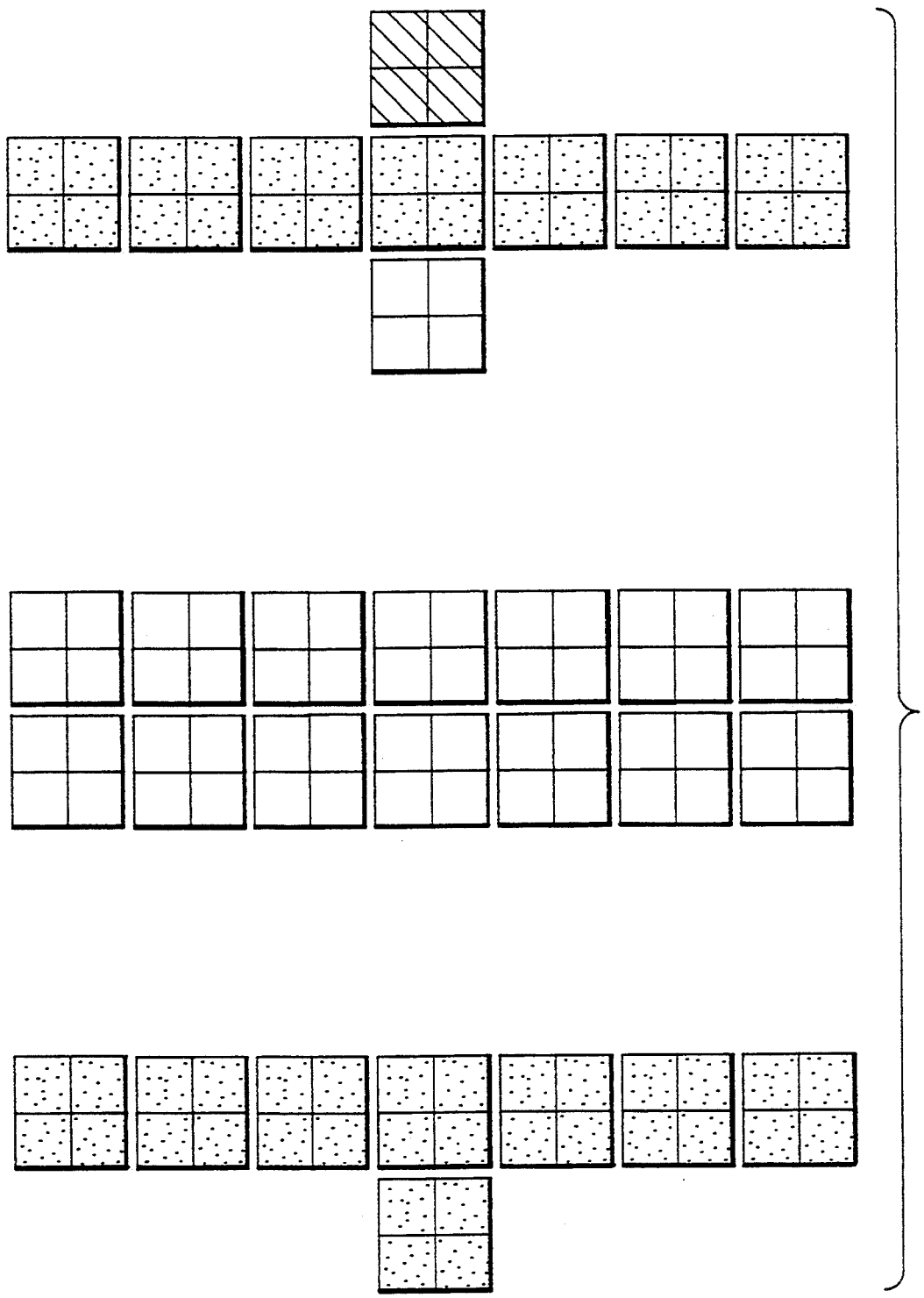

In the array of FIG. 14 less antennas are employed, and standoff correction and bed boundary detection are implemented in one dimension, while azimuthal capability is maintained for obtainment of the previously described measurements. A single point standoff correction would typically suffice in cases of low pad tilt. A single point edge-detector would be sufficient to identify the edges of uniformly dipping beds, but would not be able to map the boundaries of irregular objects like vugs.

FIG. 15A shows a minimal 4 by 2 array (which could also be designated as 2 by 4). [For non-borehole-compensated operation, which is less preferred, the minimal array could be 3 by 2, and for non-borehole-compensated operation without differential receivers, the minimal array could be 2 by 2, this also being less preferred.] FIG. 15B shows the same 4 by 2 array used in an RTTR mode. As described in copending U.S. patent application Ser. No. 848,621, any arrays operated with transmitters at the ends can alternatively be operated with receivers at the ends, and this applies to the various configurations hereof, whether illustrated or not. FIG. 16 illustrates the FIG. 15A array oriented horizontally.

Figures 17A, 17B, 17C:
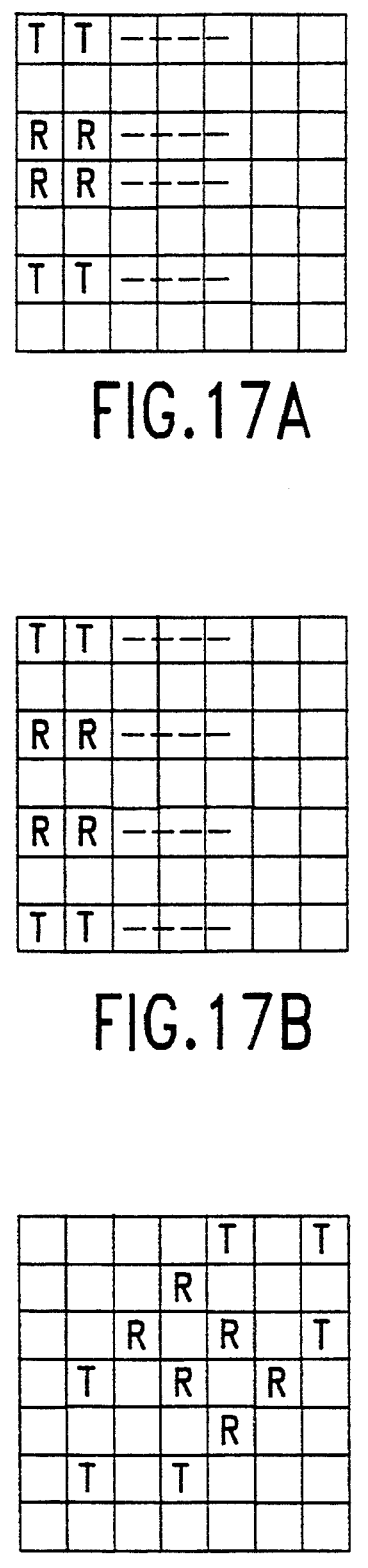
Figures 17D, 17E, 17F:
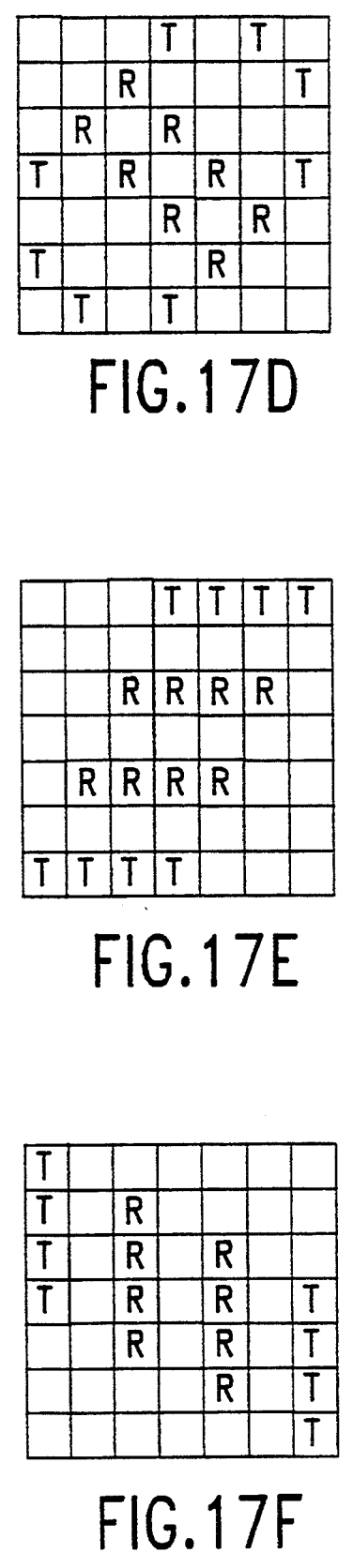

FIGS. 17A–17F illustrate some examples of operational configurations that can be used with a 7 by 7 array. FIGS. 17A and 17B show vertical T-RR-T operational configurations with different possible spacings. [The corresponding horizontal configurations are not shown in this and other cases.] FIGS. 17C and 17D show two sets of configurations to obtain 45 degree array angles, and FIGS. 17E and 17F respectively show arrays at 63.5 degrees and 26.5 degrees with respect to the horizontal axis of the array.

Figures 18A, 18B:
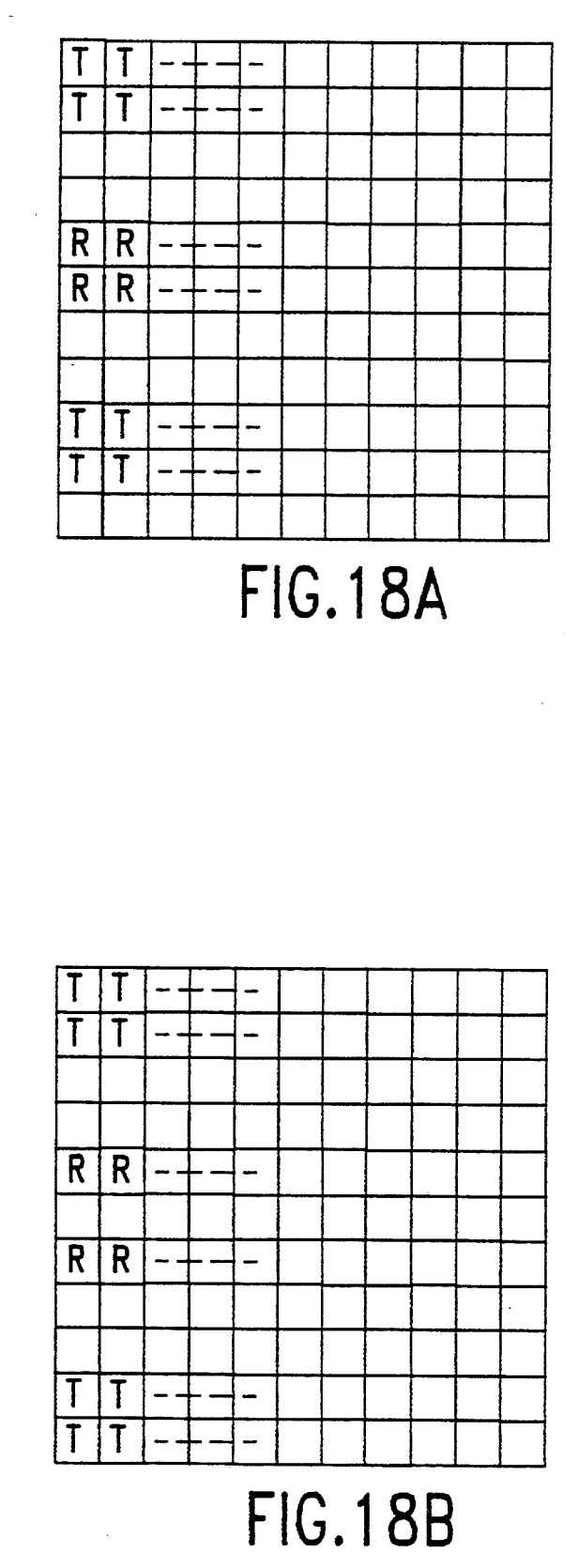
Figures 18C, 18D:
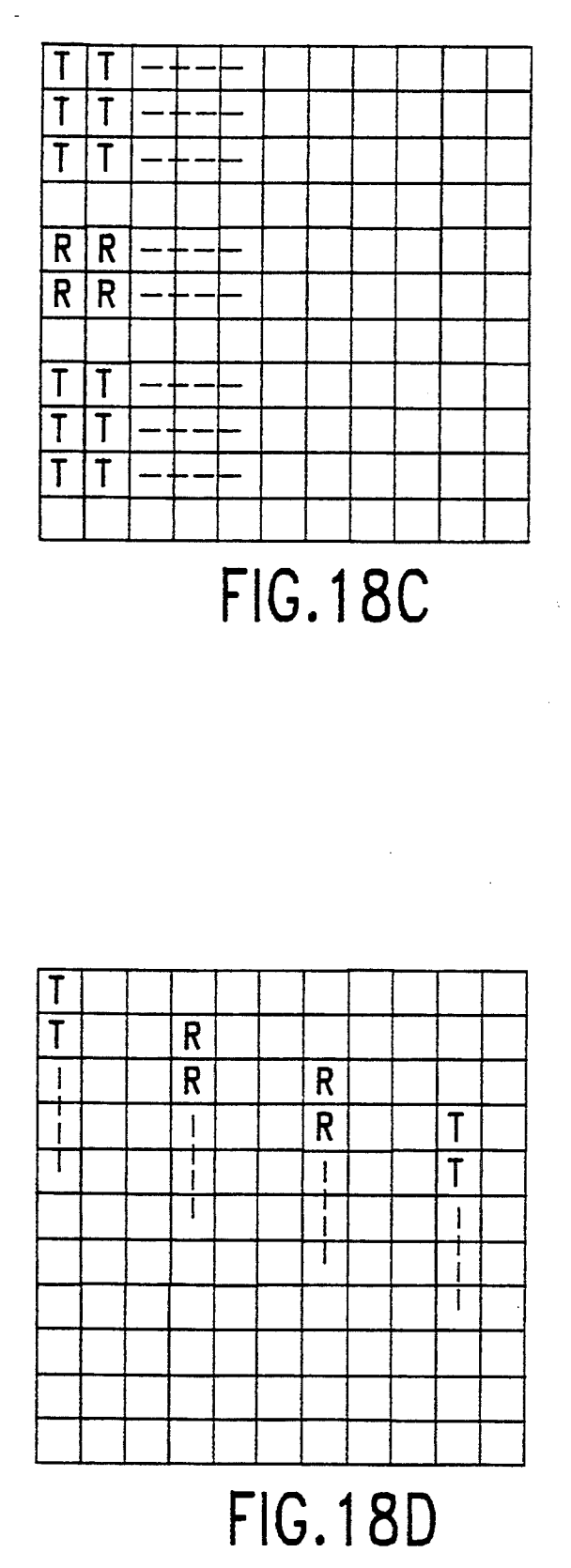
Figure 18E:
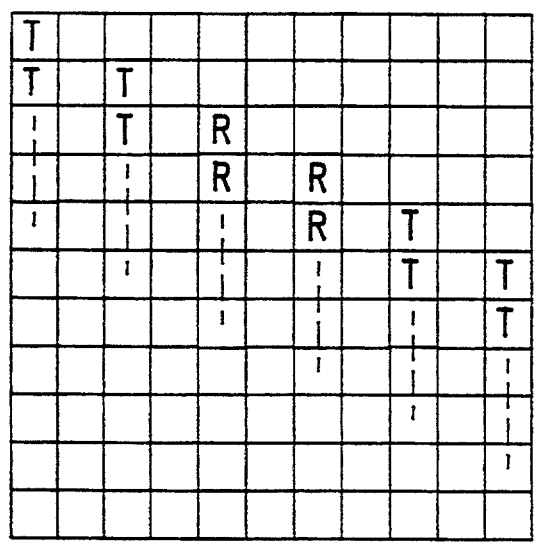

FIGS. 18A–18D illustrate 11 by 11 arrays. FIGS. 18A and 18B show operating configurations, with different antenna spacings, for a TT-RR-TT configuration. Reference can again be made to copending U.S. patent application Ser. No. 848,621, filed of even date herewith, with regard to the use of multiple transmitters and/or receivers to obtain different effective spacings and depths of investigation. FIG. 18C shows a TTT-RR-TTT operating configuration. FIGS. 18D and 1BE illustrate operating configurations at angles of 21.80 degrees [arc tan (4/10)] and 28.61 degrees [arc tan (6/11)]. The operating configurations which give the complements of these angles (68.20 degrees and 61.39 degrees) are not shown. It will be understood that any of the arrays and angles of the previously described smaller arrays can also be obtained with the larger 11 by 11 array. It will be further understood that the illustrated array sizes and the exemplary operating configurations to be used at a given time for a particular array are representative examples, and many others are possible.

In addition to the ability to provide several different linear array operational angles with respect to the tool axis, the two-dimensional array also enables obtainment of logging information at different azimuthal angles, for example by activating a number of different vertical columns (or strips) of the array in sequence, or simultaneously at different frequencies.

The invention has been described with reference to particular preferred embodiments, but variations within the spirit and scope of the invention will occur to those skilled in the art. For example, while generally symmetrical arrays have been illustrated, it will be understood that symmetry is not required. Also, the individual slot antennas can have various shapes, and could be arranged in other patterns and with other spacings, such as the diagonal pattern or a pattern which has spaces without antennas between antennas of the array. It will also be understood that more than one array can be used on a given pad, or on different pads at different longitudinal and/or azimuthal locations with respect to the tool axis.

We claim:

1. Apparatus for investigating earth formations surrounding a borehole, comprising:
    a device moveable through the borehole;
    a member mounted on said device and adapted for engagement with the borehole wall;
    a two-dimensional array of slot antennas mounted in said member;
    means for energizing at least a selected one of said antennas to transmit electromagnetic energy into the formations; and
    means for receiving said electromagnetic energy at least another selected one of said antennas.

2. Apparatus as defined by claim 1, wherein said means for receiving said electromagnetic energy comprises means for receiving said energy at a selected plurality of said antennas.

3. Apparatus as defined by claim 1, wherein said means for energizing at least a selected one of said antennas comprises means for selecting the antenna to be energized at a given time.

4. Apparatus as defined by claim 2, wherein said means for energizing at least a selected one of said antennas comprises means for selecting the antenna to be energized at a given time.

5. Apparatus as defined by claim 3, wherein said means for receiving said energy comprises means for selecting a different at least another selected antenna for receiving said energy at different times.

6. Apparatus as defined by claim 4, wherein said means for receiving said energy comprises means for selecting a different plurality of said antennas for receiving said energy at different times.

7. Apparatus as defined by claim 1, wherein each of said slot antennas has a probe which extends across the slot, each of said probes being coupled with said energizing means and/or said receiving means.

8. Apparatus as defined by claim 6, wherein each of said slot antennas has a probe which extends across the slot, each of said probes being coupled with said energizing means and/or said receiving means.

9. Apparatus as defined by claim 7, wherein at least some of said slot antennas have a second probe extending across said slot in a direction orthogonal to the direction of the first-mentioned probe of the slot; said further probes being coupled with said energizing means and/or said receiving means.

10. Apparatus as defined by claim 8, wherein at least some of said slot antennas have a second probe extending across said slot in a direction orthogonal to the direction of the first-mentioned probe of the slot; said further probes being coupled with said energizing means and/or said receiving means.

11. Apparatus as defined by claim 1, wherein each of said antennas comprises a cross-dipole antenna having orthogonal probes in a slot, and wherein the probes of each antenna are coupled with said energizing means and/or said receiving means.

12. Apparatus as defined by claim 6, wherein each of said antennas comprises a cross-dipole antenna having orthogonal probes in a slot, and wherein the probes of each antenna are coupled with said energizing means and/or said receiving means.

13. Apparatus as defined by claim 1, wherein said two-dimensional array comprises an array of at least four by two antennas.

14. Apparatus as defined by claim 6, wherein said two-dimensional array comprises an array of at least four by two antennas.

15. Apparatus as defined by claim 1, wherein said array comprises an array of at least four by four antennas.

16. Apparatus as defined by claim 1, wherein said array comprises an array of seven by seven antennas.

17. Apparatus as defined by claim 1, wherein said array comprises an array of eleven by eleven antennas.

18. Apparatus as defined by claim 1, wherein said energizing means includes means for sequentially energizing a pair of non-adjacent antennas, and wherein said receiving means comprises means for receiving signals from antennas between said sequentially energized antennas.

19. Apparatus as defined by claim 6, wherein said energizing means includes means for sequentially energizing a pair of non-adjacent antennas, and wherein said receiving means comprises means for receiving signals from antennas between said sequentially energized antennas.

20. Apparatus as defined by claim 1, wherein said the centers of the selected antennas are along a straight line.

21. Apparatus as defined by claim 20, wherein said straight line is at an angle with respect to the longitudinal direction of borehole.

22. Apparatus as defined by claim 20, wherein said straight line is perpendicular to the longitudinal direction of the borehole.

23. Apparatus as defined by claim 1, wherein said two-dimensional array comprises several adjacent columns, each containing transmitters and receivers, and wherein said means for energizing and said means for receiving are operative to respectively energize and receive independently at different ones of said columns.

24. Apparatus as defined by claim 23, wherein each of said columns is in a T-RR-T or R-TT-R arrangement.

25. Apparatus as defined by claim 23, wherein each of said columns is in a TT-RR-TT or RR-TT-RR arrangement.

26. Apparatus as defined by claim 24, wherein of adjacent columns are vertically staggered to reduce cross-talk.

27. Apparatus as defined by claim 25, wherein of adjacent columns are vertically staggered to reduce cross-talk.

28. Apparatus as defined by claim 1, wherein said array comprises a plurality of rows of relatively small slot antenna receivers and a relatively large slot antenna transmitter on each side of said rows of receivers.

29. Apparatus as defined by claim 1, further comprising means for measuring the phase shift and attenuation of the electromagnetic energy received at said at least another selected ones of said antennas.

30. Apparatus as defined by claim 29, further comprising means for determining the dielectric permittivity of said formations from said phase shift and attenuation.

31. Apparatus as defined by claim 29, further comprising means for determining the conductivity of said formations from said phase shift and attenuation.

32. Apparatus as defined by claim 1, further comprising means for receiving electromagnetic energy at a pair of antennas on adjacent opposite sides of an antenna from which the electromagnetic energy is transmitted, and means for producing an output signal dependent on the difference between the signals received at said pair of receiving antennas.

33. A method for investigating earth formations surrounding a borehole, comprising the steps of:
provided a two-dimensional array of slot antennas mounted in a borehole wall-engaging face of a member on a logging device moveable through the borehole;
energizing, at different times, a different selected one of said antennas to transmit electromagnetic energy into the formations; and
receiving, at different times, said electromagnetic energy at further different selected ones of said antennas.

34. The method as defined by claim 33, wherein said different selected ones of said energized antennas are in different rows and columns of said array.

35. The method as defined by claim 34, wherein said further different selected ones of said antennas are in different rows and columns of said array.

36. The method as defined by claim 35, further comprising measuring the phase shift and attenuation of the electromagnetic energy received at said further different selected ones of said antennas, and determining the dielectric constant of said formations at a plurality of azimuthal positions around the borehole axis from said measured phase shifts and attenuations.

37. The method as defined by claim 33, wherein said array includes first, second, and third antennas arranged in sequence in the longitudinal direction of the borehole with said second antennas between said first antenna and said third antenna, and further comprising the steps of:

transmitting electromagnetic energy from said second antenna and receiving electromagnetic energy at said first antenna and said third antenna; and producing a signal dependent on the difference between the signal received at said first antenna and the signal received at said third antenna.

38. The method as defined by claim 37, wherein said electromagnetic energy has a frequency of at least 100 MHz, and wherein said produced signal is indicative of changes in the dielectric constant of said earth formations along the longitudinal direction of the borehole.

* * * * *